Dec. 24, 1963 L. P. LANGEVIN 3,115,202
AUTOMATIC COUNTING AND WEIGHING SCALE
Filed Jan. 30, 1962 5 Sheets-Sheet 1

INVENTOR.
LLOYD P. LANGEVIN
BY Kenwood Ross
ATTORNEY.

Dec. 24, 1963            L. P. LANGEVIN            3,115,202

AUTOMATIC COUNTING AND WEIGHING SCALE

Filed Jan. 30, 1962            5 Sheets-Sheet 4

INVENTOR.
LLOYD P. LANGEVIN

BY *Kenwood Ross*

ATTORNEY.

3,115,202
AUTOMATIC COUNTING AND WEIGHING
SCALE
Lloyd P. Langevin, 20075 NE. 21st Ave.,
North Miami Beach, Fla.
Filed Jan. 30, 1962, Ser. No. 169,713
4 Claims. (Cl. 177—200)

The present invention relates generally to new and useful improvements and structural refinements in scales and is directed more particularly to the provision of a fully automatic counting scale, having general utility in the arts, and to improvements in means for readily converting a fan type scale from a weighing scale to a counting scale or conversely.

For many years, various scale manufacturers have been attempting, without success, to develop a fully automatic counting and/or weighing scale incorporating a means whereby the number of individual parts in any given unit could be automatically counted and/or weighed.

I have determined that this can be accomplished by replacing the pendulum of a fan type weighing scale with a ratio pan and statically balancing the entire indicating mechanism wherefore the scale is converted to a counting scale. To reconvert into a weighing scale, it is necessary only to place a suitable weight in the ratio pan. The key to success herewith lies in the fact that the entire indicating mechanism must be in static balance and, herewith, I provide means for accomplishing same.

It is a principal object of the present invention to provide apparatus for attachment to a scale so as to provide means for automatically counting the number of articles in a platform load or for determining accurately when a desired number of articles of substantially uniform weight have been placed thereupon.

Like other counting scales, the structure hereof embodies receiver means into which an indicated number of the parts of the type to be counted may be placed so as to serve as a counterbalance weight.

Another object of the instant invention resides in the provision of a count indicating device in the form of a dial chart and cooperating pointer, to provide a determination of the count, in lieu of the conventional system of reading the graduations upon the multiple graduated beam. Such dial construction is particularly advantageous in that a greater length of graduated scale may be employed, with the attendant advantages of a more accurate reading thereof and a greater capacity thereof.

The instant invention is useful as a plain weighing scale, a computing scale or as a counting scale.

In mercantile establishments, and also particularly in factories where small parts are made, various forms of counting scales have been employed. These counting scales usually comprise a beam scale having, in place of the manually shiftable poise, an article receptacle into which are placed a certain definite number of articles. The article carrier is usually manually adjusted upon the beam by a suitable mechanism, and when the beam comes to balance, the number of articles on the platform is ascertained by a reading of a particular scale on the beam, corresponding to the number of articles in the weight carrier. These scales have usually been used solely for counting purposes. It is among the objects of the present invention to provide a scale which may be used for counting purposes as well as for ordinary weighing operations. Other objects reside in the provision of a scale which is automatic in character, i.e., the scale is adapted to automatically counterbalance the load without manual manipulation.

In addition, the scale is adapted to be used as a computing scale for determining prices of articles weighed, parcel post rates, and other computed costs.

Other objects of the invention will be pointed out in more detail in the accompanying specification and more particularly defined in the appended claims.

Other prime objects reside in the provision of a multiplicity of scales on the dial and a pointer used in conjunction therewith which may be set to sweep over the particular scale employed. The different scales will correspond with the number of articles placed in the receiver and will be plainly marked so as to show the number of articles to be employed, thereby minimizing the possibility of errors in reading the count.

The invention has particular reference to counting scales, wherein a relatively large number or quantity of small articles of one kind are balanced against a smaller number of articles of the same kind. Knowing the "weighing ratio" of the scale, it is then a simple matter to compute the number of articles in the larger pile. For example, the weighing ratio may be 100:1; that is, where a unit weight in one pan balances a weight of one hundred units in the other pan. If it is then desired to count out, say, five hundred small articles, for instance five hundred bolts of a certain size, five bolts are placed in the pan on the longer arm of the scale and enough bolts are then placed into the other pan to attain a balance. The number of bolts in the said other pan would therefore be five hundred. If the ratio is fixed or invariable, the number of articles on the shorter arm must always be an even multiple of the number of articles on the longer arm.

It is to be stressed that the key point of the present invention lies in the placement or hanging of a pan or ratio pan at the end of or at any location along the pendulum lever. Such ratio pan allows the introduction of a counter-balancing load into the mechanism of the scale so as to provide a count on a chart of the number of pieces in the platform or "scoop load."

As a second key essential of the instant invention, it is to be stressed that the indicating mechanism, inclusive of the ratio pan, must be maintained in static balance.

By the means hereof, I am able instantly to convert a weighing scale to a counting scale, or a counting scale to a weighing scale, merely by the addition of a weight to the ratio pan of a fan type scale or the subtraction of a weight from said ratio pan.

Still additionally, as a key feature hereof, the provision of a chart which serves both the counting and weighing functions is a significant improvement over the known prior art.

Another object hereof is to provide a counting means in the form of an attachment which can be readily applied to existing scales of standard types. A still further object is to provide a scale which can be used for counting or ordinary weighing, at will.

To these and other ends, the invention consists in the novel features of construction and combinations of elements hereinafter described in connection with the drawings, wherein.

Figure 1:
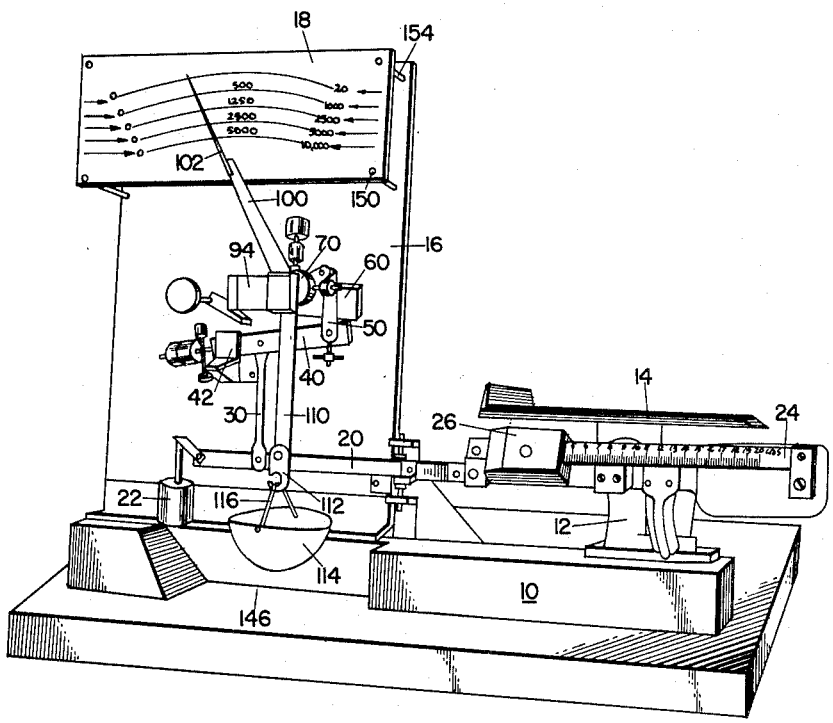
FIG. 1 is a perspective view of a scale embodying the present invention, with portions of the scale housing having been omitted for purposes of clarity.

Referring now to the drawings, wherein is illustrated a preferred embodiment of my invention, I have shown a scale comprising a base 10, a pedestal 12 fixed upon said base and upwardly supporting a commodity receiver or platform 14, and an upright housing 16 (only the rear wall of which is shown in the drawings) also fixed upon said base. The housing supports a counting and weight-indicating chart 18 upon which delineations are imprinted, as will hereinafter be referred to.

Enclosed within base 10 is a suitable lever system (not shown) whereby the weight of any load placed upon platform 14 may be sensed by to a main or platform lever 20 suitably fulcrumed at one end thereof to pedestal 12 and having a dash-pot 22 linked to and suspended from its opposite free end, which dash-pot serves to control the speed of the scale indicating needle (later to be described) as it sweeps across the dial face.

The scale will also include the usual tare beam 24 having the usual sliding poise or weight 26 slidably disposed thereon, which combination may be used for tare and also for normal weighing operations.

Said tare beam may carry a pendant weight (not shown) on which the usual weights for increasing the capacity of the scale can be placed.

The parts so far described constitute a regular weighing and price computing scale and may be used for the ordinary weighing and price computing purposes.

In many places where scales are used, it is desirable to provide a mechanism for counting various small articles. To this end, I have provided a supplementary mechanism which may be coupled with the above delineated parts to convert the weighing scale into a counting scale.

The said poise 26 may be slidably arranged upon the tare beam whereby the added weight of any container placed upon platform 14 may be offset, as will hereinafter appear.

Figure 2:
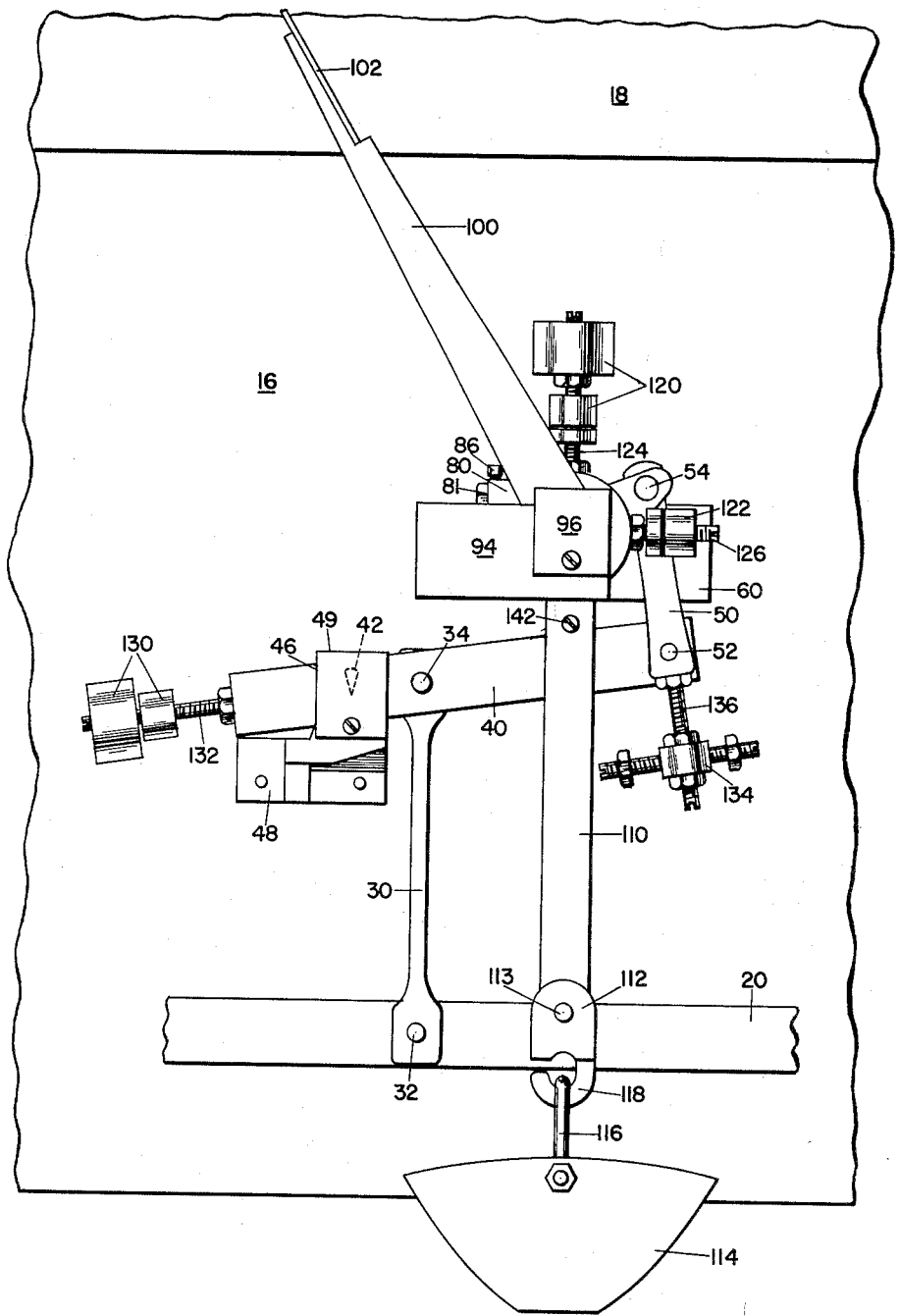
FIG. 2 is an enlarged, fragmentary, elevational view of the counting and/or weighing mechanism of the scale shown in FIG. 1.

As best shown in FIG. 2, a substantially vertically-disposed primary connecting link 30 is pivoted at its lower extremity at 32 to main or platform lever 20 and at its upper extremity at 34 to a balance lever 40. A beam pivot 42 extends transversely relative to balance lever 40 and is balanced thereupon by means of upright arms 44 and 46 of a bracket 48 fixed to and extending transversely and outwardly from the rear wall of housing 16.

Suitable retainer plates 49, preferably integral with each of said arms 44 and 46, limit upward displacement of beam pivot 42 and hence of balance lever 40 during operational use.

Balance lever 40 is pivotally suspended at its opposite end by means of a secondary connecting link 50 depending from the pendulum lever balance assembly, subsequently to be described. Said secondary connecting link 50 is pivoted at its lower end at 52 to balance lever 40, and is pivoted at its upper end at 54 to the said pendulum lever balance assembly, which is in turn pivotally mounted upon an upper bracket 60 stationarily secured to the rear wall of housing 16.

Figure 5:
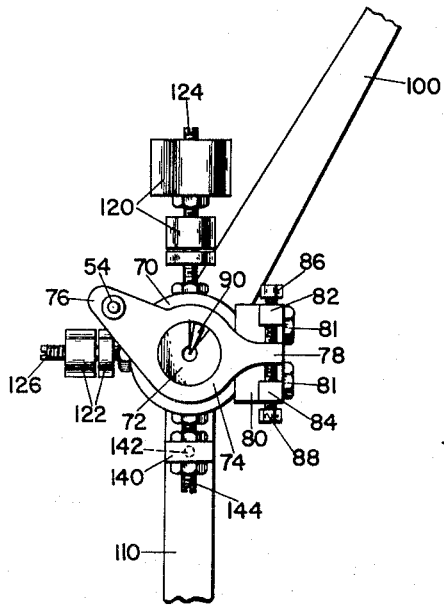
FIG. 5 is an elevational view taken from the rear of the pendulum lever balance assembly of the invention.
Figure 6:
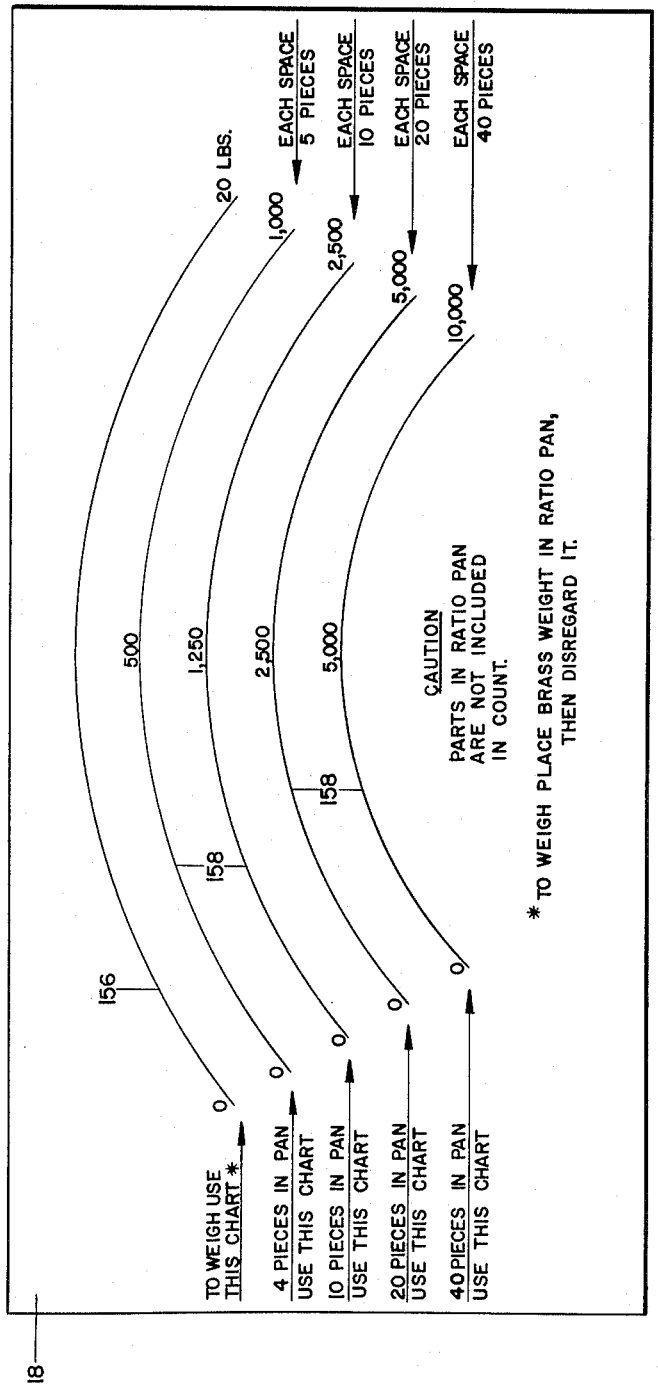
FIG. 6 is an elevational view of the combination weighing and counting chart of the scale.

The pendulum lever balance assembly, best observable in FIG. 5, comprises an annular ring 70 having a cylindrical drum 72 concentrically nested therewithin and extending rearwardly and outwardly beyond the rear planar surface thereof. Drum 72 is provided with an adjustment member 74 sleeved thereon and having an arm 76 and a tail 78 extending radially outwardly therefrom. Arm 76 carries a pivot pin 54 to which the upper end of secondary connecting link 50 is pivoted.

An adjustment bracket 80 is fixed to the peripheral edge of ring 70, as by bolts 81 or equivalent, and includes a pair of spaced, vertically-aligned, arms 82 and 84 extending rearwardly therefrom. Arms 82 and 84 of the pair will have adjustment screws 86 and 88 respectively extending through suitable openings therein and will be threadedly engaged therein. As shown in FIG. 5, the free end of adjustment screw 86 bears upon the upper planar surface of tail 78 of adjustment member 74, while the free end of adjustment screw 88 bears upon the lower planar surface of said tail.

By appropriate relative rotation of screws 86 and 88, the positioning of adjustment member 74, relative to drum 72, and accordingly the relative position of pivot 54, may be varied through the pressure exerted upon tail 78 by one or the other or both of the screws 86 or 88, as the case may be.

A beam pivot 90 extends laterally through drum 72 and projects outwardly of the opposite planar faces thereof so as to seat upon spaced, horizontally-aligned, arms 92 and 94 integral with upper bracket 60. A retainer plate 96 may be fixed to each of the arms 92 and 94 to preclude upward displacement of beam pivot 90 and of the pendulum balance assembly during operative use.

An indicator arm 100, having a pointer 102 at its upper and outer free extremity, is fixed to a planar face of ring 70 as by a screw 104 or other suitable means so as to extend radially outwardly therefrom, wherefore pointer 102 may sweep the face of chart 18.

A pendulum lever 110 is also fixed to a planar face of ring 70 and depends generally vertically downwardly therefrom.

A hanger 112 is pivoted at 113 to the lower end of pendulum lever 110 and will have a ratio pan 114 suspended therefrom by means of a cross bar 116 fixed to said ratio pan and engageable with a hook portion 118 of hanger 112.

Such ratio pan 114 replaces the usual pendulum weight normally disposed at the lower end of the pendulum lever.

The entire assemblage is statically balanced, first, by means of adjustable weights 120 and 122 threadedly engaged with shafts 124 and 126 respectively, which extends radially outwardly from ring 70, and second, by means of adjustable weights 130 threadedly engaged with a threaded shaft 132 extending outwardly from one end of balance lever 40.

An adjustable weight 134 will be threadedly engaged with a shaft 136 which is threadedly engaged in the lower end portion of secondary connecting link 50 to serve the function of maintaining link 50 in static balance after it has passed dead center, thus insuring that pointer 102 moves across chart 18 at an even rate of speed, and does not accelerate in speed as it moves toward the extreme left or extreme right positions.

Without such weight means, an indicator needle approaches the extreme right or left of chart 18, there would be a slow, almost unperceptible, gain of speed caused by the fact that the upper portion of link 50 would have a tendency to tilt in either direction after passing center, to the left when pointer 102 is on the left side of the chart (as in FIG. 2) and to the right when pointer 102 is at the right side of the chart.

Figure 3:
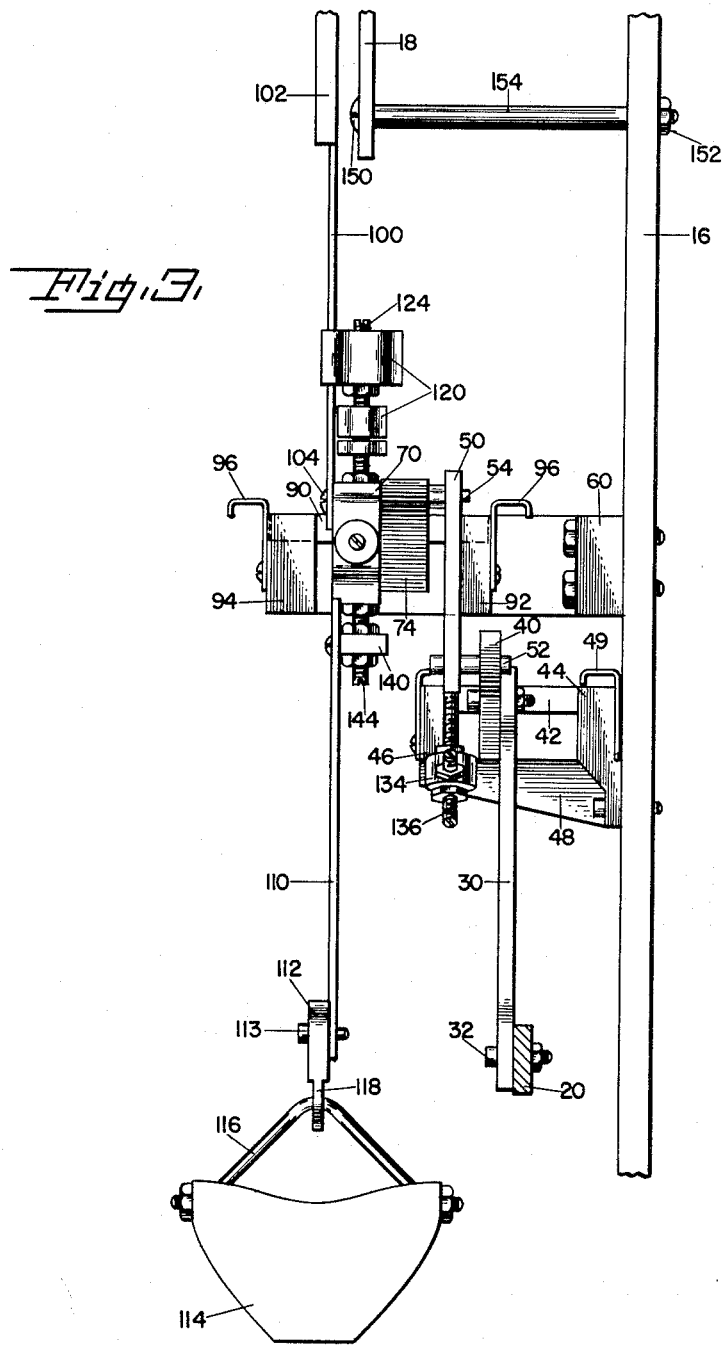
FIG. 3 is an end elevational view, as viewed from the right in FIG. 2.
Figure 4:
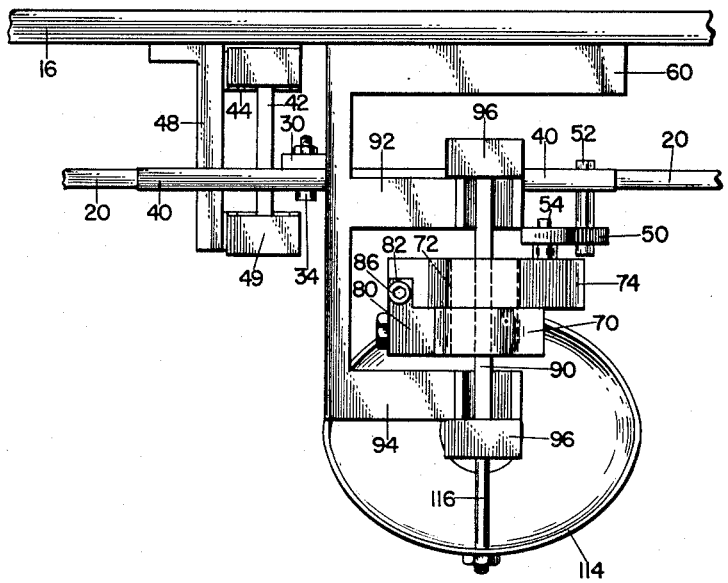
FIG. 4 is a top plan view of the mechanism shown in FIG. 2, with certain of the components having been omitted to simplify same.

Pendulum lever 110 will have a lug 140 (see FIGS. 3 and 5) fixed to its rear planar face as by a screw 142. A vertically extending bolt 144 is threadedly engaged with said lug and also in ring 70, thus permitting vertical adjustment to seal the scale to the correct ratio, i.e. to adjust the scale so that it will count accurately. She said lug 140 also serves to brace the pendulum lever against axial distortion as weight is placed in ratio pan 114.

Base 10 will be suitably cut away as at 146 to permit the suspension of the ratio pan from the lower end of pendulum lever 110.

Counting and weight-indicating chart 18 will be fixed to housing 16 in spaced relation therewith as by elongated bolts 150, nuts 152 threaded thereupon, and spacing discs 154 sleeved upon said bolts intermediate the chart 18 and housing.

The chart 18 will have rows of graduations or scales 156 and 158 delineated upon its face, with row 156 being graduated in pounds for use when the scale is being used as a weighing scale, and with each of the rows 158 being graduated to indicate the count of individual pieces when the scale is being used as a counting scale.

The operator of the scale, desiring to count the number of individual pieces in a certain lot, must first determine the weight of the container which he will use so that the tare can be set off on tare beam 24. This he can do with facility by placing a weight of predetermined poundage in ratio pan 114 and the empty container upon platform 14, at which moment, the weight of the container is indicated upon scale 156 of chart 18. This weight may be set-off, by setting a tare beam poise at the exact same weight on tare beam 24.

By placing such weight in the ratio pan, the operator converts his scale from a counting scale to a pendulum weighing scale.

The operator is now ready to count automatically an unknown quantity of parts. He first removes the weight from the ratio pan whereupon the scale is converted to a counting scale. To count, he places the loaded container upon platform 20 or he places the load in his container on the platform, and he places the indicated number of the type of parts to be counted in ratio pan 114, whereupon pointer 102 indicates on one of the scales 158 of chart 18 the exact number of pieces which are in the load.

The device thus serves not only as a means for counting the number of articles upon the scale platform but also as a means for determining accurately when a desired number of articles of substantially uniform weight have been placed upon the platform.

In essence, a relatively large number of articles of a type are balanced against a smaller number of articles of the same kind. Knowing a predetermined number of parts of the type to be counted and the "weighing ratio" of the scale, it is but a simple matter to compute the number of articles in the larger and unknown quantity. Suppose that the weighing ratio is 100:1. Herewith, the weight of one unit in one pan will balance the weight of one hundred such units in the other. In case it is desired to count out, say, five hundred of such articles, five of same may be placed in the pan on the longer arm of the scale and other units thereof may be placed in seriatim into the other until a static balance is attained wherefore the number of units in the latter pan would be five hundred.

It is believed that the gist of the invention will be clearly understood from the foregoing disclosure and accordingly further analysis thereof at this point is considered unnecessary, as I have, in accordance with the provisions of the patent statutes, described the construction and principle of operation of my invention together with the apparatus which I believe to represent the best embodiment thereof, to the end that others can, by applying current knowledge, readily adapt it for various applications without omitting features which, from the standpoint of prior art, fairly constitute essential characteristics of its generic and/or specific aspects. The substitution of equivalents and other changes, modifications and alterations as circumstances may suggest or render expedient, are reasonably contemplated, the invention being susceptible of such without departing from its real spirit or underlying principles.

I claim:
1. In a counting and weighing scale, the combination of, a base, a counting and weight-indicating chart integral with said base, a pedestal fixed on said base for supporting a commodity-receiving platform, a platform lever fulcrumed relative to said pedestal, a balance assembly including a ring having a pendulum lever depending therefrom and an indicator arm having a pointer adapted to sweep said chart, a balance lever pivotally suspended from said balance assembly, and means carried by said pendulum lever for supporting a load of a predetermined number of pieces to be counted by an indication of the count on said chart of the number of pieces in a counter-balance load placed upon said commodity-receiving platform.

2. In a scale as set forth in claim 1, with a statically balanced link operatively connecting said balance lever and said balance assembly whereby said indicator arm sweeps said chart at an even rate of speed.

3. In a counting and weighing scale, the combination of, a base, a counting and weight-indicating chart integral with said base, a pedestal fixed on said base for supporting a commodity-receiving platform, a platform lever fulcrumed to said pedestal, a balance assembly including a ring having a pendulum lever depending therefrom and an indicator arm having a pointer adapted to traverse said chart, a balance lever pivotally suspended from said balance assembly by means of a statically balanced link extending therebetween whereby said pointer floats at an even rate of speed as it traverses said chart, and means on said pendulum lever whereby a counter-balancing load will indicate a count on said chart of the number of pieces in a load placed upon said commodity-receiving platform.

4. In a counting and weighing scale, in combination, a base, a housing on said base, a counting and weight-indicating chart in said housing, a pedestal on said base supporting a commodity-receiving platform, a platform lever fulcrumed to said pedestal and pivotally connected to a balance lever, said balance lever in turn being pivotally mounted relative to said housing, a balance assembly including a ring pivoted relative to said housing and having a pendulum lever depending therefrom and an indicator arm having a pointer adapted to traverse said chart extending radially outwardly therefrom, means comprising a statically balanced link pivotally suspending said balance lever from said balance assembly whereby said pointer traverses said chart at an even rate of speed and whereby a counter-balancing load will indicate a count on said chart of the number of pieces in a load placed upon said commodity-receiving platform.

References Cited in the file of this patent
UNITED STATES PATENTS

| Re. 15,857 | Hapgood | June 10, 1924 |
| 674,646 | De Vilbiss | May 21, 1901 |
| 1,101,215 | Simonsson | June 23, 1914 |
| 1,379,215 | Riedel | May 24, 1921 |
| 1,446,131 | Sides | Feb. 20, 1923 |
| 1,499,775 | Hem | July 1, 1924 |
| 1,611,431 | Mittendorf | Dec. 21, 1926 |